United States Patent
Koto et al.

[11] 3,946,093
[45] Mar. 23, 1976

[54] PROCESS FOR PREPARING POLYPHOSPHONATE

[75] Inventors: Noriaki Koto; Keiichi Kondo; Naotake Okada, all of Ichihara, Japan

[73] Assignee: Nissan Chemical Industries, Ltd., Tokyo, Japan

[22] Filed: Dec. 26, 1974

[21] Appl. No.: 536,577

[30] Foreign Application Priority Data
Apr. 27, 1974  Japan................................ 49-48018

[52] U.S. Cl................................ 260/973; 260/990
[51] Int. Cl.$^2$.......................................... C07F 9/40
[58] Field of Search........................... 260/973, 990

[56] References Cited
UNITED STATES PATENTS
2,952,666   9/1960   Coover et al. .................. 260/973 X OTHER PUBLICATIONS
Weissberger, Technique of Organic Chemistry, Vol. III (1956), p. 821.

Primary Examiner—Richard L. Raymond
Attorney, Agent, or Firm—Oblon, Fisher, Spivak, McClelland & Maier

[57] ABSTRACT

An improvement is disclosed in a process for preparing a polyphosphonate which comprises polycondensing an aromatic diol having the formula (I) – (IV)

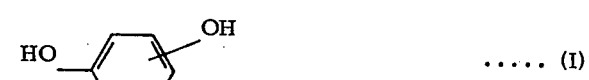

..... (I)

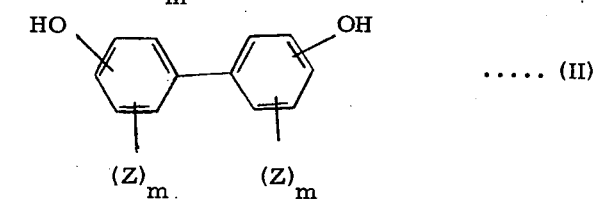

..... (II)

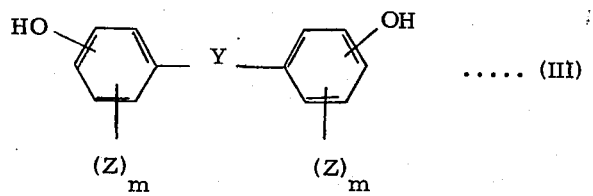

..... (III)

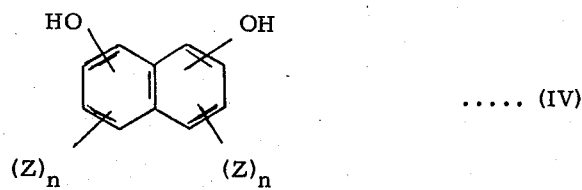

..... (IV)

wherein Z represents chlorine or bromine atom or a lower alkyl group and $m$ represents 0 or an integer of from 1 to 4 and $n$ represents 0 or an integer of from 1 to 3; Y represents an alkylene group, cycloalkylene group, sulfonyl group, carbonyl group or oxygen atom; with a dihalide or arylphosphonic or thiophosphonic acid having the formula (V)

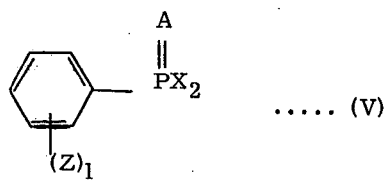

..... (V)

wherein A represents oxygen or sulfur atom; X represents chlorine or bromine atom; Z represents chlorine or bromine atom or a lower alkyl group; and $l$ represents 0 or an integer of from 1 to 5, wherein the improvement comprises maintaining a solution of the polyphosphonate at a temperature such that solid polyphosphonate is produced after flashing; and then evaporating all or a part of the solvent from the solution by flashing whereby a porous solid polyphosphonate is formed.

9 Claims, No Drawings

PROCESS FOR PREPARING POLYPHOSPHONATE

BACKGROUND OF THE INVENTION

1. Field of the Invention:

The present invention relates to a process for preparing a high molecular weight polyphosphonate.

2. Description of the Prior Art:

The polyphosphonates are marked by their high flame retardance and thermal stability. In addition they are often used to impart flame retardance to various polymers.

Heretofore, the following processes have been used to prepare the polyphosphonates:

1. The arylphosphonic dihalide and the aromatic diol are charged into a reactor and are heated with stirring in an inert gas atmosphere while both the rise in temperature and decrease in pressure are controlled according to the progress of the dehydrohalide polycondensation reaction, whereby a molten polyphosphonate is given. (melt-polycondensation process).

2. The arylphosphonic dihalide and the aromatic diol and a suitable solvent are charged in a reactor and are heated with stirring to effect a dehydrogen-halide (i.e. removal of hydrogen halide) polycondensation reaction, whereby a polyphosphonate solution is given. (solution polycondensation process).

3. The arylphosphonic dihalide is dissolved in a water insoluble solvent and the solution is added with stirring to an alkaline aqueous solution of the aromatic diol to effect the polycondensation reaction. A polyphosphonate solution is obtained by separating the water phase. (interfacial polycondensation process).

In these conventional processes, the polycondensation reaction has been improved by using a catalyst, if desirable.

In the first process, no solvent is required and, accordingly, the process is simple. However, in order to perform the polycondensation reaction, it is necessary to raise the reaction temperature to a point higher than the melting point of the polyphosphonates. Moreover, the handling of the polyphosphonates is troublesome because the viscosity of the reaction system increases during the progress of the polycondensation reaction, reaching several hundred thousand centipoise or higher. Also, because hydrogenhalide is generated by the polycondensation, a serious corrosion problem occurs and a special corrosion resistant reactor is necessitated. Moreover, since the polycondensation is performed at high temperature for a long time, the resulting polyphosphonate can be colored by side reactions or contaminated by insoluble by-products, deteriorating the product quality.

On the other hand, in accordance with the processes (2) and (3) the polycondensation reaction can be performed under relatively mild conditions. Consequently, it is possible to employ a reactor having only a glass lining on its inner surface. The difficulty of selecting non-corrosive material for the reactor is not involved and high quality products having no coloring can be obtained easily. However, in these processes it is necessary to separate the polyphosphonate from the reactant solution. The ordinary practice, particularly (2), process 92), is to pour the solution into a large amount of non-solvent in order to precipitate the polyphosphonate, and follow with subsequent separation and drying. However, the following disadvantages are attendant to this technique:

1. In order to perform the precipitation smoothly a relatively large amount of reaction solvent, e.g., more than two times the amount of the polyphosphonate, is required.
2. In order to precipitate the polyphosphonate, more than several times as much non-solvent as solvent is required.
3. The time required for the precipitation is relatively long.
4. In order to remove the solvent from the precipitated solid, many washings with the non-solvent are required.
5. The precipitated solid is usually bulky.
6. The solid separated from the solution contains a large amount of the non-solvent and, consequently, it takes a long time to dry.
7. From the large volume of the mixture of the non-solvent and the solvent, each component must be separated.

The separation and recovery of the product and the solvent are quite complicated, whereby a large sized apparatus is required and the process has a low efficiency. The polyphosphonate is relatively unstable and easily decomposed by hydrolysis or alcoholysis. In the separation and recovery processes, the complicated treatment last for a long time whereby the hydrolysis of the polyphosphonate is made quite possible. When an alcohol is used as the non-solvent, alcoholysis of the polyphosphonate can occur instead, thereby decreasing the quality of the product, especially the molecular weight.

There is another process for separating and recovering the polyphosphonate from the solution in which the solution is heated to evaporate the solvent. In this process, the viscosity of the solution increases as the concentration rises, the heat-conductance of the mixture is low and the handling of the materials is quite difficult. Accordingly, it is not amenable to being performed on an industrial scale. Moreover, the product is colored and insoluble by-products are produced. The quality of the product also suffers because the highly viscous solution of the polyphosphonate is treated at high temperature for a long time.

It would be highly desirable to have a new process for separating the polyphosphonate which is not subject to the above disadvantages.

SUMMARY OF THE INVENTION

Accordingly, it is an object of the present invention to provide such a trouble-free process.

It is another object of this invention to effectively separate a porous solid polyphosphonate from a solution of polyphosphonate which is prepared from a dihalide of arylphosphonic acid or arylthiophosphonic acid and an aromatic diol.

The polyphosphonates can be prepared by polycondensation of an aromatic diol having the formula (I) – (IV)

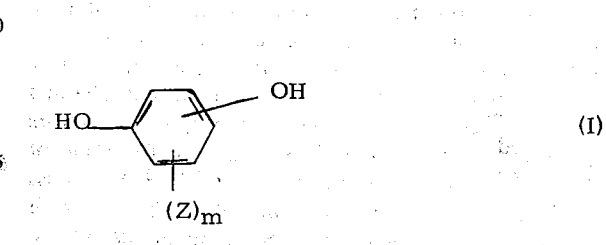

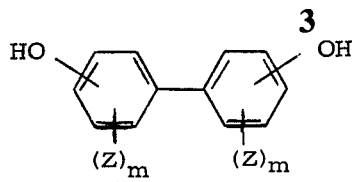

(II)

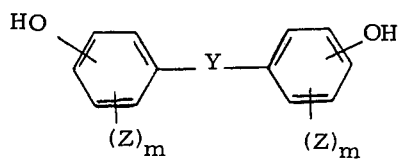

(III)

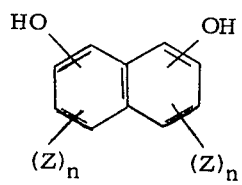

(IV)

wherein Z represents a chlorine or bromine atom or a lower alkyl group $C_1 - C_{10}$, $m$ represents 0 or an integer from 1 to 4, $n$ represents 0 or an integer from 1 to 3 and Y represents an alkylene $C_2 - C_{10}$ group, cycloalkylene $C_4 - C_8$ group, sulfonyl group, carbonyl group or oxygen atom; with a dihalide of arylphosphonic or thiophosphonic acid (hereinafter referred to as arylphosphonic dihalide) having the formula (V)

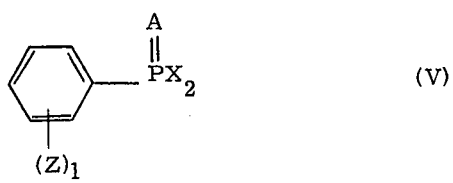

(V)

wherein A represents an oxygen or sulfur atom; X represents a chlorine or bromine atom; Z represents a chlorine or bromine atom or a lower alkyl $C_1 - C_{10}$ group; and $l$ represents 0 or an integer from 1 to 5.

These and other objects of the invention as will hereinafter be made clear by the discussion below, have been attained by the fundamental finding that when a heated solution of the polyphosphonate is discharged to a low pressure region, the polyphosphonate can be recovered as a porous solid by rapid volatilization of the solvent. One feature of the invention is a process for preparing a porous solid polyphosphonate which comprises polycondensing the aromatic diol having the formula (I) – (IV) with the phosphonic dihalide having the formula (V) to form a solution of the polyphosphonate and flashing the solution rapidly at such a temperature that the polyphosphonate is solidified by evaporation of whole or part of the solvent. The second feature of the invention is a process for preparing porous solid polyphosphonate which comprises polycondensing the aromatic diol having the formula (I) – (IV) with the phosphonic diahlide having the formula (V) to form a solution of the polyphosphonate and bringing the solution from a high pressure zone, which is maintained at a temperature such that the polyphosphonate is solidified by evaporation of whole or part of the solvent, to a zone in which the pressure is maintained lower than the solvent vapor pressure.

The polyphosphonate product of the invention can be prepared by using any solution of the polyphosphonate prepared by either the solution polycondensation process or the interface polycondensation process. The resultant solid polyphosphonate is crushed and then dried under atmospheric or reduced pressure if necessary.

The process of the invention is free from the above mentioned disadvantages. Furthermore it has the following advantages:

a. A high concentrated solution of the polyphosphonate can be used.
b. No non-solvents are required.
c. The solidification can be efficiently performed in a short time.
d. The drying is quite easy.

Overall, the process is quite simple and the apparatus quite compact. Accordingly, the process is very suitable for industrial use. Additionally, the conditions are quite mild whereby high quality product is obtained.

DETAILED DESCRIPTION OF THE PREFERRED EMBODIMENTS

Suitable aromatic diols having the formula (I) – (IV) include hydroquinone; resorcinol; tetrachlorohydroquinone; 4,4'-dihydroxybiphenyl; bis(4-hydroxyphenyl) methane; 2,2'-bis(4-hydroxphenyl)propane; 2,2-bis(2-hydroxyphenyl)propane; 2,2-bis(3,5-dichloro-4-hydroxyphenyl)propane; 2,2-bis(3,5-dibromo-4-hydroxyphenyl)propane; 2,2-bis(3,5-dibromo-4-hydroxyphenyl)propane; bis(4-hydroxyphenyl)cyclohexane; bis(4-hydroxyphenyl)sulfone; bis(2-hydroxyphenyl)sulfone; 2-hydroxyphenyl 4'-hydroxy phenylsulfone; bis(3-methyl-4-hydroxyphenyl)sulfone; bis(3,5-dimethyl-4-hydroxyphenyl)sulfone; bis(3,5-dibromo-4-hydroxymethyl)sulfone; 4,4'-dihydroxydiphenylether; 4,4'-dihydroxybenzophenone; 1,5-dihydroxynaphthalene; 2,7-dihydroxynaphthalene, etc.

Suitable dihalides of arylphosphonic or thiophosphonic acid having the formula (V) include:

phenylphosphonic dichloride; phenylphosphonic dibromide; chlorophenylphosphonic dichloride; bromophenylphosphonic dichloride; methylphenylphosphonic dichloride; dimethylphenylphosphonic dichloride; phenylthiophosphonic dichloride; phenylthiophosphonic dibromide; chlorophenylthiophosphonic dichloride; bromophenylthiophosphonic dichloride; methylphenylthiophosphonic dichloride; dimethylphenylthiophosphonic dichloride, etc.

The nature of the polycondensation reaction of the aromatic diol having the formula (I) – (IV) with the arylphosphonic dihalide having the formula (V) is not restricted. However, it is advantageous to prepare the solution of the polyphosphonate by either the solution polycondensation process or the interface polycondensation process. In the case of the solution polycondensation process, the arylphosphonic dihalide and the aromatic diol are mixed with a suitable solvent and the mixture is heated to a temperature high than about 50°C with stirring in order to effect the dehydrohalide polycondensation reaction. It is also possible to add a catalyst such as calcium chloride, magnesium chloride, aluminum chloride, tin, iron, etc., in order to perform the polycondensation reaction smoothly. The molar ratio of the arylphosphonic dihalide to the aromatic diol is preferably in the range of 1.00 : 0.90 – 1.10. The molecular weight of the resultant polyphosphonate can be adjusted by selecting the molar ratio within the range. In the interfacial polycondensation process, the aromatic diol is dissolved in an alkaline aqueous solution and the solution of the arylphosphonic dihalide or a water immiscible organic solvent solution of the arylphosphonic dihalide is added to the aqueous solution to rapidly effect the dehydrohalogenation polycondensation reaction in the region of the interface between the water phase and the organic phase. It is preferable to use a solvent for smoothly performing the reaction, whereby the polyphosphonate can be separated from the water phase in solution. In order to perform the reaction in high efficiency, it is customary to provide vigorous stirring at relatively low temperature in the presence of a catalyst consisting of a quaternary ammonium salt. The solvent used in the process should be inert to the components and stable at the reaction temperature and be able to dissolve the polyphosphonate.

It is possible to apply the process of the present invention to the purification or other treatment of a solution prepared by dissolving a solid polyphosphonate obtained by the molten polycondensation process or the solventless interfacial polycondensation process. In carrying out the process of the invention the higher the concentration of the polyphosphonate in the solution the lower is the amount of the solvent to be stripped off. Accordingly, higher concentration is preferred. The amount of the solvent should be less than 500 parts, preferably less than 300 parts to 100 parts, by weight of the polyphosphonate. The solvent should be inert to the components and stable at the reaction temperature. If the boiling point of the solvent is high, the temperature of the solution must also be high. Consequently, the drying of the porous solid polyphosphonate is difficult. Accordingly, it is preferable to use a solvent having a boiling point lower than 200°C, preferably lower than the melting point of the polyphosphonate. Suitable solvents include methylenechloride; chloroform; 1,2-dichloroethane; 1,1,2-trichloroethane; chlorobenzene; dichlorobenzene; chlorotoluene; tetrahydrofuran; dimethylformamide, etc.

In the process of the invention, the porous solid polyphosphonate is recovered by flashing the solution of the polyphosphonate from the high pressure reaction zone to a low pressure zone. In the process, the pressure of the high pressure zone should be higher than the pressure of the low pressure zone but still appropriate for solidifying the polyphosphonate by evaporation of the solvent. The higher pressure zone should have a pressure higher than 1 kg/cm$^2$ (gauge) and the lower pressure zone should have a pressure 1–1000 kg/cm$^2$ (gauge) lower than that of the higher pressure zone. In practice, it is necessary to increase the temperature in the high pressure zone so as to evaporate a large amount of the solvent in the low pressure zone. Since the vapor pressure of the high pressure zone becomes higher than atmospheric pressure. On the other hand, in order to rapidly evaporate the solvent from the solution by boiling, the pressure of the low pressure zone, should be lower than the pressure of the high pressure zone, preferably lower than the vapor pressure of the solvent which depends on the temperature and the concentration of the solution in the high pressure zone. The temperature of the solution in the high pressure zone can be higher or lower than the melting point of the polyphosphonate. However, a temperature range must be selected such that the polyphosphonate is separated as a solid after flashing in which all or a part of the solvent is evaporated and the polyphosphonate is cooled by the evaporation process. In order to evaporate a sufficient quantity of the solvent to solidify the polyphosphonate in the solution, the latter process occuring by provision of the latent heat of vapourization of the polyphosphonate, the solution in the high pressure zone should be kept at a temperature higher than a certain critical temperature. The proper critical temperature is dependent upon the type and molecular weight of the polyphosphonate, the type of solvent, the concentration of the solution and the pressure of the low pressure zone. The temperature of the solution required for solidifying the polyphosphonate is lower when the softening point of the polyphosphonate is high, the affinity of the solvent is low, the boiling point of the solvent is low, the concentration of the solution is high, or the pressure of the low pressure zone is low. In order to effectively perform the evaporation of the solvent and the solidification of the polyphosphonate, the temperature of the solution is preferably high and is usually higher than the boiling point of the solvent at normal pressure. On the other hand, if the temperature is too high, the polyphosphonate and the solvent are decomposed. Accordingly, it is preferable to keep the temperature of the solution lower than 300°C.

When the amount of evaporation in the low pressure zone is not sufficient, porous solid polyphosphonate cannot be obtained; only a viscous liquid which is difficult to treat is produced. No particular method of discharging the solution of the polyphosphonate from the high pressure zone to the low pressure zone is required. It can be performed by discharging the solution through the solution through a slit or a nozzle in the form of block, fiber or film. The solution discharged to the low pressure zone is immediately boiled to evaporate the solvent. The solution becomes concentrated and forms a viscous liquid because of the decrease of both the amount of solvent and the temperature; further the porous solid is formed in bulk by the evaporation. This porous solid polyphosphonate can be recovered. The process is performed by flashing of the solvent, whereby the process is accomplished within a short time.

In the low pressure zone, in order to prevent a recondensation of the solvent vapor on the solidified polyphosphonate, it is preferable to pass an inert gas in order to decrease the partial pressure of the solvent vapor. For the same reason, it is preferable to maintain the low pressure zone at a relatively high temperature, but the temperature should be lower than the softening point of the polyphosphonate so as to allow formation of the porous solid polyphosphonate.

The porous solid polyphosphonate prepared by the invention can be recovered in the form of a block, fiber or film depending upon the operation. The product is porous and rigid and has low elasticity whereby the product can be easily cut or crushed to form granules or a powder. The porous solid polyphosphonate prepared by the process of the invention usually contains a small amount of the solvent. Accordingly, it is preferable to use the product after drying in order to decrease the content of the solvent even though the product can be used without drying. The drying of the porous solid, granules or powder can be easily performed by the conventional method of heating at atmospheric or reduced pressure to give a product containing less than 0.5% by weight of the solvent (i.e. substantially no solvent content).

The recovering process of the invention is very simple; it involves only heating the solution of the polyphosphonate and evaporating the solvent rapidly under reduced pressure. Continuous operation can be easily attained; efficiency of the apparatus is high; the process is suitable for a large scale industrial production; recovery of the solvent is easy and the quality of the polyphosphonate is high. Accordingly, the process of the invention has many industrial advantages and is very economical.

Having generally described the invention, a further understanding can be obtained by certain specific examples which are provided herein for purposes of illustration only and are not intended to be limiting in any manner.

EXAMPLE 1

A. Preparation of the polyphosphonate solution:

In a 3 l flask made of glass, 585.0 g of phenylphosphonic dichloride, 773.4 g of bis (4-hydroxyphenyl) sulfone, 1140 g of 1,2-dichloroethane and 1.8 g of anhydrous magnesium chloride were charged and refluxed with stirring to react them. As the reaction proceeded hydrogenchloride gas was generated yielding a viscous solution of the polyphosphonate after 25 hours. This solution was charged into a 2 l autoclave made of stainless steel and was concentrated by evaporating the solvent yielding a solution of 100 wt. parts of the polyphosphonate in 70 wt. parts of 1,2-dichloroethane.

B. Separation and Recovery of the Polyphosphonate:

The apparatus for separating and recovering the polyphosphonate is a cylindrical flashing tower having a diameter of 100 mm and a height of 500 mm equipped with a needle valve at the bottom of the autoclave. The flashing tower has openings having narrow diameter at the top and at the bottom and is equipped with a nitrogen gas inlet at the bottom, a nitrogen gas outlet at the top and a heater for heating the outer body of the tower. The needle valve outlet is inserted in the top part of the flashing tower and is arranged so as to prevent gas leakage. From the nitrogen inlet at the bottom part of the flashing tower, nitrogen gas heated to about 100°C under normal pressure was continuously fed at a rate of 50 l NTP/min. (rate of flow per minute in the standard state). The nitrogen gas was discharged from the outlet at the top. The flashing tower was heated from the outer surface so as to maintain the inner temperature at 100°C. The pressure of the flashing tower was slightly higher than atmospheric pressure.

The solution of the polyphosphonate in the autoclave was heated with stirring to 186° – 190°C whereby the pressure of the autoclave was about 10.5 kg/cm$^2$ (gauge). In this condition, the needle valve at the bottom of the autoclave was opened to continuously feed the solution of the polyphosphonate to the flashing tower at a rate of about 40 g/min. of the polyphosphonate. The solvent was rapidly evaporated from the solution at the outlet of the needle valve, whereby the white porous linear solid was continuously recovered from the bottom of the flashing tower. The diameter of the white porous linear solid was dependent upon the particular take-up speed employed. It ranged from about 5 to about 20mm. The evaporated solvent remaining in the flashing tower was discharged together with nitrogen gas from the gas outlet at the top part of the flashing tower.

The recovered polyphosphonate linear product contained 2.5% by weight of 1,2-dichloroethane, and had a bulk density of 0.52 g/cm$^3$. It was brittle at room temperature and was easily cut and crushed. The powdered product was dried at 140°C under a reduced pressure of 12 mm Hg for 3 hours to yield 1190 g of the powdery white polyphosphonate containing less than 0.01% by weight of the solvent. The yield was 95%. The inherent viscosity ($\eta$) of the polyphosphonate was 0.455 dl/g at 30°C in a solvent mixture of phenol and 1,2,2-tetrachloroethane in a ratio of 3:2 by weight.

REFERENCE

The solution of 100 wt. parts of the polyphosphonate in 70 wt. parts of 1,2-dichloroethane prepared by the process of Example 1, was heated at 80°C and fed to the flashing tower at a rate of 30 g/min. The process of Example 1 was repeated except for the latter condition. The solvent was evaporated from the surface of the linear product to form a thin, foamed solid surface. However, the inner part of the linear product was a viscous liquid which was not solidified by cooling and could not be dried in a powdery form.

EXAMPLE 2

The process of Example 1 was repeated except for the use of 777.2 g of bis (4-hydroxyphenyl) sulfone and 0.9 g of anhydrous magnesium chloride to prepare a solution of 100 wt. parts of the polyphosphonate in 48 wt. parts of 1,2-dichloroethane. In accordance with the process of Example 1, the resulting solution was heated at 176°C whereby the pressure of the autoclave was about 6.9 kg/cm² (gauge). Nitrogen gas heated to 116°C was fed into the flashing tower at a rate of 181 NTP/min. The solution of the polyphosphonate was flashed at a rate of 50 g/min. of the polyphosphonate, whereby a porous linear solid having a bulk density of 0.42 g/cm³ and a diameter of about 20mm was recovered from the bottom of the flashing tower. The recovered polyphosphonate linear product contained 6.0% by weight of 1,2-dichloroethane. The product was cut and crushed and then dried at 140°C under the reduced pressure of 12mm Hg for 3 hours to yield a powdery white polyphosphonate containing a less than 0.01% by weight of the solvent with an inherent viscosity ($\eta$) of 0.398 dl/g at 30°C in a solvent mixture of phenol and 1,1,2,2-tetrachloroethane in a ratio of 3:2 by weight.

EXAMPLE 3

In a 1 l glass flask, 195.0 g of phenylphosphonic dichloride, 257.8 g of bis (4-hydroxyphenyl) sulfone, 380 g of 1,2-dichloropropane and 0.6 g of anhydrous magnesium chloride were charged. The mixture was heated for 22 hours and concentrated in the autoclave in accordance with the process of Example 1 yielding a solution of 100 wt. parts of the polyphosphonate in 70 wt. parts of 1,2-dichloropropane. Then, the solution was heated at 190°C under a pressure of 7 kg/cm² (gauge) and flashed at a rate of 30 g/min. in accordance with the process of Example 1. (The resulting porous linear product contained 3.2 wt% of 1,2-dichloropropane). The dried polyphosphonate had an inherent viscosity ($\eta$) of 0.400 dl/g at 30°C.

EXAMPLE 4

In a 1 l glass flask, 195.0 g of phenylphosphonic dichloride, 256.5 g of bis (4-hydroxyphenyl) sulfone, 568 g of 1,1,2,3-tetrachloroethane and 0.7 g of anhydrous calcium chloride were charged and refluxed with stirring in order to react them for 10 hours. The solution was charged in a 1 l autoclave made of stainless steel and was concentrated to give a solution of 100 wt. parts of the polyphosphonate in 50 wt. parts of tetrachloroethane. The solution was heated to about 225°C under a pressure of about 3.5 kg/cm² (gauge) and was flushed at a rate of 20 g/min. to the flashing tower in which nitrogen gas heated to 160°C was fed at a rate of 301 NTP/min. The product was treated in accordance with the process of Example 1. (The resulting porous linear product contained 4.3 wt % of tetrachloroethane). The dried powdery polyphosphonate had an inherent viscosity ($\eta$) of 0.544 dl/g at 30°C.

EXAMPLE 5

In a 3 l flask, 125 g of bis (4-hydroxyphenyl) sulfone was dissolved in 1020 ml of 0.1N NaOH and the solution was cooled to from −6° to −1°C. A solution of 98 g of phenylphosphonic dichloride in 1000 g of dichloromethane was added dropwise to the cooled alkaline solution over about 20 min. with vigorous stirring. The mixture was then stirred at about −5°C for 40 min. and the organic phase was separated, washed with water, dried with calcium chloride and was concentrated by evaporating the solvent. It was subsequently charged to the 1 l autoclave and further concentrated to give a solution of 100 wt. parts of the polyphosphonate in 50 wt parts of dichloromethane. The solution was heated at 125°C under a pressure of about 6.8 kg/cm² (gauge) and was flushed at a rate of 120 g/min. to the flashing tower in which nitrogen gas heated to about 70°C was fed at a rate of 201 NTP/min. in accordance with the process of Example 1, whereby a popcorn type solid having a diameter of about 5 – 20 mm was continuously obtained from the bottom. The product has a bulk density of 0.19 g/cm³ and contained 4.3% by weight of dichloromethane. The product was crushed and dried at 140°C under a reduced pressure of 12mmHg for 3 hours to produce 176 g of powdery white polyphosphonate having an inherent viscosity ($\eta$) of 0.105 dl/g at 30°C. The yield was 86%. The solvent content was less than 0.1 wt%.

EXAMPLE 6

In each of three 1 l flasks, 1.0 mole of hydroquinone, 4,4'-hydroxybiphenyl or 2,2-bis(4-hydroxyphenyl) propane was charged. 195 g (1.0 mole) of phenylphosphonic dichloride, 380 g of 1,2-dichloroethane and 0.9 g of anhydrous magnesium chloride were charged into each of the three flasks. The mixture in each flask was refluxed with stirring for 48 hours. Each of the solutions was concentrated in the 1 l autoclave to produce solutions of 100 wt. parts of the polyphosphonate in 50 wt. parts of 1,2-dichloroethane. Each solution was heated at about 170°C under a pressure of 6.5 kg/cm² (gauge) and was flushed at a rate of 20 g/min. of the polyphosphonate to the flashing tower in which nitrogen gas heated to 80°C was fed at a rate of 201 NTP/min. in accordance with the process of Example 1, whereby a porous linear solid having a diameter of about 20 mm was produced in each case. Each product was cut, crushed and dried at 60° – 80°C under reduced pressure 2 mm Hg for 10 hours yielding in each case powdery white polyphosphonate. The solvent content after the flashing and the inherent viscosity ($\eta$) at 30°C of each product are shown in Table 1.

TABLE 1

| Experiment No. | Aromatic diol | Solvent content after flushing (%) | ($\eta$) (dl/g) |
|---|---|---|---|
| 1 | Hydroquinone | 4.3 | 0.22 |
| 2 | 4,4'-dihydroxy biphenyl | 5.7 | 0.17 |
| 3 | 2,2-bis(4-hydroxyphenyl propane | 4.6 | 0.27 |

EXAMPLE 7

In a flask, 97.6 g of phenylphosphonic dichloride, 272.5 g of 2,2-bis(4-hydroxy-3,5-dibromophenyl) propane, and 1500 g 1,2-dichloroethane were charged and cooled to 0°C in a dry nitrogen atmosphere 122 g of triethylamine was added dropwise with stirring to the solution over about 1 hour. The reaction was continued at 0°C for 1.5 hours and at 25°C for 1 hour. The product was washed with water to remove the amine and its salt. The solution was dehydrated with anhydrous calcium chloride and concentrated in the autoclave to give a solution of 100 wt. parts of the polyphosphonate in 45 wt. parts of 1,2-dichloroethane. The solution was flushed at the rate of 15 g/min. in accordance with the process of Example 6. (The resulting porous linear product contained 6.2 wt. % of dichloroethane). The dried polyphosphonate had an inherent viscosity ($\eta$) of 0.140 dl/g at 30°C.

EXAMPLE 8

In a flask, 105.5 g of phenylthiophosphonic dichloride, 125.1 g of bis (4-hydroxyphenyl) sulfone, 0.305 g of anhydrous magnesium chloride and 450 g of tetrachloroethane were charged and the mixture was heated at 150°C with stirring for 65 hours. The solution was concentrated in the autoclave to give a solution of 100 wt. parts of the polyphosphonate in 45 wt. parts of tetrachloroethane. The solution was flashed in accordance with the process of Example 6. (The resulting porous linear product contained 8.5 wt % of tetrachloroethane). The dried polyphosphonate had an inherent viscosity ($\eta$) of 0.16 dl/g at 30°C.

EXAMPLE 9

In a 10 l flask, 1950 g of phenylphosphonic dichloride, 2588 g of bis(4-hydroxyphenyl) sulfone, 3800 g of 1,2-dichloroethane and 6.0 g of anhydrous magnesium chloride were charged and the mixture was refluxed with stirring for 25 hours. The solution was charged into a 10 l autoclave and was concentrated by evaporating about 1900 g of 1,2-dichloroethane to produce a solution of 100 wt. parts of the polyphosphonate in 50 wt. parts of the solvent. A heating pipe, having a diameter of 10 mm and a length of 1000 mm, covered with an outer tube was connected to the bottom valve of the autoclave. A needle valve was connected to the other end which was connected to a flashing tower made of stainless steel having a diameter of 200 mm and a length of 1600 mm. A hot nitrogen gas inlet was equipped at the lower part of the tower which was opened to discharge the product. A nitrogen gas outlet was equipped at the top part of the tower, and the entire tower could be heated from the outside.

The resulting solution of polyphosphonate was heated to 110°C and pressurized nitrogen gas was charged into the autoclave to keep the inner pressure at about 10 kg/cm² (gauge). A heating medium was passed through the outer heating jacket tube provided at the lower part of the autoclave in order to adjust the temperature of the solution at the lower end of the heating tube to 170°C. The flashing tower was heated to 100°C from the outside and hot nitrogen gas at 100°C was passed at a rate of 70 liter NTP/min. The valve provided at the bottom of the autoclave was opened and the needle valve provided at the lower end of the heating tube was gradually opened to flush the solution contained in the autoclave to the flashing tower. The evaporated solvent vapor was discharged with nitrogen gas from the upper discharge outlet of the flashing tower. The porous linear product having a diameter of about 20 mm was continuously discharged from the lower end of the flashing tower. The product was cut by a cutter to form a crushed white powder. The porous linear product contained 2.3 wt. % of the solvent. The powder was dried at 140°C under a pressure of 12 mmHg for 3 hours, yielding a polyphosphonate having an inherent viscosity ($\eta$) of 0.397 dl/g at 30°C (With a solvent content of less than 0.1%).

Having now fully described the invention, it will be apparent to one of ordinary sill in the art that many changes and modifications can be made thereto without departing from the spirit or scope of the invention as set forth herein.

What is claimed as new and intended to be covered by Letters Patent is:

1. In a process for preparing a polyphosphonate which comprises polycondensing an aromatic diol having the formula (I) – (IV)

(I)

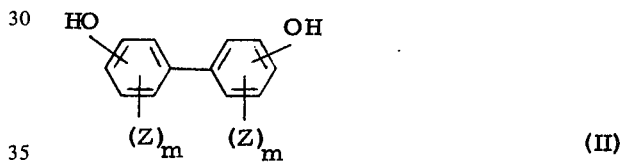
(II)

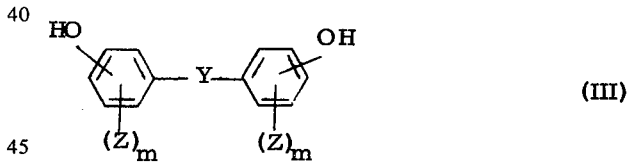
(III)

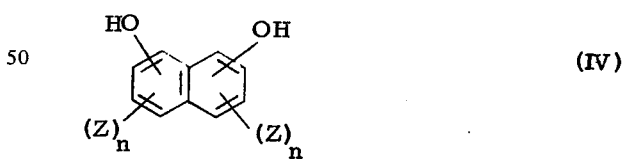
(IV)

wherein Z represents chlorine or bromine atom or a lower alkyl group and m represents 0 or an integer of from 1 to 4 and n represents 0 or an integer of from 1 to 3; Y represents an alkylene group, cycloalkylene group, sulfonyl group, carbonyl group, or oxygen atom; with a dihalide of arylphosphonic or thiophosphonic acid having the formula (V)

(V)

wherein A represents oxygen or sulfur atom; X represents chlorine or bromine atom, and l represents 0 or an integer of from 1 to 5, the improvement which comprises the steps of 1. maintaining in a high pressure zone a solution of said polyphosphonate in an organic solvent at a temperature of 125° – 300°C;
2. discharging the solution of step (1) into a low pressure zone wherein all or a portion of the organic solvent is flashed and porous solid polyphosphonate is formed, the pressure of said low pressure zone being lower than the vapor pressure of said organic solvent and lower than that of said high pressure zone; and
3. recovering said porous solid polyphosphonate.

2. The process for preparing a polyphosphonate of claim 1, wherein the molar ratio of the aromatic diol to the dihalide of arylphosphonic or thiophosphonic acid is 1.00: 0.90 – 1.10.

3. The process for preparing a polyphosphonate according to claim 1, wherein an inert gas is fed into the lower pressure zone.

4. The process for preparing a polyphosphonate of claim 1, wherein the solvent for the solution of the polyphosphonate contains less than 500 wt. parts to 100 wt. parts of the polyphosphonate.

5. The process for preparing a polyphosphonate of claim 4, wherein the solvent is selected from the group consisting of chloroform, methylene chloride, 1,2-dichloroethane, 1,1,2-trichloroethane, 1,1,2,2-tetrachloroethane, 1,2-dichloropropane, 1,2-dichlorobutane, chlorobenzene, dichlorobenzene, chlorotoluene, tetrahydrofuran or dimethylformamide.

6. The process for preparing a polyphosphonate of claim 1, wherein the porous solid polyphosphonate is further heated to remove the remaining solvent.

7. The process for preparing a polyphosphonate of claim 1, wherein the higher pressure zone has a pressure of higher than 1 kg/cm$^2$ (gauge) and the lower pressure zone has a pressure 1–1000 kg/cm$^2$ (gauge) lower than that of the higher pressure zone.

8. The process for preparing a polyphosphonate of claim 1, wherein the solution of the polyphosphonate is heated to a temperature higher than the atmospheric boiling point of the solvent employed.

9. The process for preparing a polyphosphonate of claim 1, wherein the solution of the polyphosphonate is heated to a temperature, such that the solution has enough heat to vapourize all of the solvent in the lower pressure zone.

* * * * *